US007093133B2

(12) United States Patent
Hopkins et al.

(10) Patent No.: US 7,093,133 B2
(45) Date of Patent: Aug. 15, 2006

(54) GROUP SIGNATURE GENERATION SYSTEM USING MULTIPLE PRIMES

(75) Inventors: Dale W. Hopkins, Georgetown, KY (US); Thomas W. Collins, Saratoga, CA (US); Steven W. Wierenga, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 967 days.

(21) Appl. No.: 10/037,238

(22) Filed: Dec. 20, 2001

(65) Prior Publication Data

US 2003/0120931 A1    Jun. 26, 2003

(51) Int. Cl.
*G06F 11/30* (2006.01)
(52) U.S. Cl. ...................................... 713/176; 713/186
(58) Field of Classification Search ................ 713/176, 713/182, 200, 201
See application file for complete search history.

(56) References Cited

U.S. PATENT DOCUMENTS

| 5,224,163 | A | * | 6/1993 | Gasser et al. ................. 380/30 |
| 5,276,737 | A | * | 1/1994 | Micali .......................... 380/30 |
| 5,422,953 | A | * | 6/1995 | Fischer ........................ 713/172 |
| 5,481,613 | A | * | 1/1996 | Ford et al. .................... 380/30 |
| 6,209,091 | B1 | * | 3/2001 | Sudia et al. ................. 713/175 |

* cited by examiner

*Primary Examiner*—Thomas R. Peeso

(57) ABSTRACT

A method is provided for generating a group digital signature wherein each of a group of individuals may sign a message M to create a group digital signature S, wherein M corresponds to a number representative of a message, $0 \leq M \leq n-1$, n is a composite number formed from the product of a number k of distinct random prime factors $p_1 \cdot p_2 \cdot \ldots \cdot p_k$, k is an integer greater than 2, and $S = M^d \pmod{n}$. The method may include: performing a first partial digital signature subtask on a message M using a first individual private key to produce a first partial digital signature $S_1$; performing at least a second partial digital signature subtask on the message M using a second individual private key to produce a second partial digital signature $S_2$; and combining the partial digital signature results to produce a group digital signature S.

17 Claims, 4 Drawing Sheets

| INDIVIDUAL OF GROUP | GROUP_1 | GROUP_2 | GROUP_3 | GROUP_4 | GROUP_5 |
|---|---|---|---|---|---|
| INDIVIDUAL_1 | $n_{11}=p_1p_6$ | $n_{21}=p_1p_2$ | $n_{31}=p_1p_4$ | $n_{41}=p_1p_5$ | $n_{51}=p_1p_3$ |
| INDIVIDUAL_2 | $n_{12}=p_2p_3$ | $n_{22}=p_3p_4$ | $n_{32}=p_2p_6$ | $n_{42}=p_3p_6$ | $n_{52}=p_4p_6$ |
| INDIVIDUAL_3 | $n_{13}=p_4p_5$ | $n_{23}=p_5p_6$ | $n_{33}=p_3p_5$ | $n_{43}=p_2p_4$ | $n_{53}=p_5p_2$ | k = 3

| INDIVIDUAL # | GROUP_1 | GROUP_2 | GROUP_3 |
|---|---|---|---|
| INDIVIDUAL_1 | $n_{11}=p_1$ | $n_{21}=p_2$ | $n_{31}=p_3$ |
| INDIVIDUAL_2 | $n_{12}=p_2 p_3$ | $n_{22}=p_1 p_3$ | $n_{32}=p_1 p_2$ |

FIG. 5 k = 5

| INDIVIDUAL # | GROUP_1 | GROUP_2 |
|---|---|---|
| INDIVIDUAL_1 | $n_{11}=p_1$ , | $n_{21}=p_1$ |
| INDIVIDUAL_2 | $n_{12}=p_2 p_3$ | $n_{22}=p_2 p_4$ |
| INDIVIDUAL_3 | $n_{13}=p_4 p_5$ | $n_{23}=p_3 p_4$ |

FIG. 6

GROUP SIGNATURE GENERATION SYSTEM USING MULTIPLE PRIMES

BACKGROUND OF THE INVENTION

1. Field of the Invention

The present invention relates generally to cryptographic systems, and more particularly to a system and method for generating an authentic cryptographic group signature.

2. Description of the Prior Art

The application of a signature to a document may serve to indicate that the document originates from the signer, or to show that the signer somehow endorses the information to communicated by the document. In the context of business, signatures are customarily applied to documents for the purpose of forming contracts and executing financial transactions. In government, a properly signed document may serve to ratify a law or a government action.

With the advent of computer networking, electronic documents have been gradually replacing paper documents. Validating the authenticity of electronic documents is a problem that has been addressed by digital signatures A digital signature of a message is a number which is the result of a calculation dependent on some secret known only to the signer, and also on the content of the message being signed. A signature must be verifiable. If a dispute arises as to whether a party signed a message, an unbiased third party should be able to resolve the matter without requiring access to the signer's secret information.

Digital signatures may be created and verified by cryptography. Digital signatures commonly use public key cryptography, which employs an algorithm using two different but mathematically related keys; one for creating a digital signature or encoding data, and another key for verifying a digital signature or decoding the message. Computer equipment and software utilizing this method are commonly known as asymmetric cryptosystems.

The keys of an asymmetric cryptosystem are commonly referred to as the private key, known only to the signer and used to create the digital signature, and the public key which is used to verify the digital signature. If many people need to verify a signer's digital signature, the associated public key must be available. A public key may be published or held in an on-line repository or directory where it is easily accessible. Although the public and private keys are mathematically related, it is extraordinarily difficult to derive the private key from knowledge of the public key. Thus, although people may know the public key of a given entity and use it to verify that entity's signatures, they cannot discover the private key and use it to forge digital signatures. This is sometimes referred to as the principle of irreversibility.

Hash functions are commonly used in software for creating and verifying digital signatures. A hash function is an algorithm used to create a digital representation in the form of a hash value or hash result of a standard length which is usually much smaller than the message. Any change to the message produces a different hash result when the same hash function is used. In the case of a secure hash function, sometimes termed a one-way hash function, it is computationally infeasible to derive the original message from knowledge of its hash value.

Use of a digital signature usually involves two processes, one performed by the signer and the other by the receiver of the digital signature. Creation of a digital signature usually includes deriving a hash value of the message to be signed and then performing a mathematical operation on that value using the private key. Typically, the digital signature is attached to the corresponding message and transmitted to a second party. Verification of the digital signature is accomplished by computing a new hash result of the original message using the same hash function that was used to create the digital signature. Using the public key to invert the received signature, and then comparing that with the new hash result, a verifier may check: whether the digital signature was created using the corresponding private key; and whether the newly computed hash result matches the original hash result which was transformed into the digital signature during the signing process. Verification software typically confirms the digital signature as verified if: the signer's private key was used to digitally sign the message, which is determined to be the case if the signer's public key is used to verify because the signer's public key will only verify a digital signature created with the signer's private key; and the message was unaltered, which is found to be the case if the hash result computed by the verifier is identical to the hash result extracted from the digital signature during the verification process.

The use of digital signatures has already proven to be a reliable and secure means of authenticating digital messages. However, the applicants of the present patent application have observed that conventional asymmetric cryptosystems do not provide a means for generating group digital signatures where a document must be signed by more than one person.

Corporations, government bodies, and other organizations often institute policies that require more than one authorized individual to endorse a certain type of decision before the organization may act as a whole. To approve a decision made on behalf of an organization, it is a necessary and common practice to prepare a document that must be signed by more than one individual. For example, a corporation may require that a purchase order for goods or services exceeding a certain amount must be signed by a requesting employee, a manager, and finally a vice president. This purchase order would bear the name of the corporation, and would explain that the purchase order is only valid if it bears all of the required signatures.

What is needed is a secure system and method for generating a group digital signature wherein each of a group of individuals may sign a message M to create a group digital signature.

SUMMARY OF THE INVENTION

It is an object of the present invention to provide a system and method for generating a group digital signature wherein each member of a group of authorized individuals must sign a message M to create a group digital signature S.

It is another object of the present invention to provide a system and method for generating a group digital signature wherein each of the group of individuals sign the message M using a unique individual private key that is not known or accessible to other members of the group.

It is a further object of the present invention to provide a system and method for generating a group digital signature wherein more than one such group of individuals may be authorized to sign a message M to create the same group signature which is the signature of the entity that includes all of the groups.

It is yet another object of the present invention to provide a method for creating and distributing individual private keys to individuals within different groups, wherein each group is capable of generating a group signature for a common entity that includes all of the groups, and wherein each private key may be used to generate a partial digital signature.

Briefly, a presently preferred embodiment of the present invention includes a method for generating a group digital signature wherein each of a group of individuals may sign a message M to create a group digital signature S, wherein M corresponds to a number representative of a message, $0 \leq M \leq n-1$, n is a composite number formed from the product of a number k of distinct random prime factors $p_1 \cdot p_2 \cdot \ldots \cdot p_k$, k is an integer greater than 2, and $S \equiv M^d \pmod{n}$. In accordance with one embodiment, the method includes the steps of: a first individual in a group performing a first partial digital signature subtask on a message M using a first individual private key to produce a first partial digital signature $S_1$; at least a second individual in the group performing a second partial digital signature subtask on the message M using a second individual private key to produce a second partial digital signature $S_2$; and combining the partial digital signature results including the results $S_1$ and $S_2$ to produce the group digital signature S corresponding to the message M.

In accordance with one aspect of the present invention, the of the individual private keys includes: an associated individual modulus $n_i$ that is a number formed as a product of one or more of the k prime factors of the group modulus n; and an associated individual private exponent $d_i$ that is determined based on a selected public group exponent e, and also based on the prime factors of the associated individual modulus $n_i$. Each of the individual private exponents $d_i$ may be determined as a number congruent to the inverse of the public group exponent e, modulo the Euler Totient function of the associated individual modulus $n_i$.

In one embodiment, the first individual is assigned a first number $m_1$ of the k prime factors of the group modulus n and the second individual is assigned a second number $m_2$ of the k prime factors of the group modulus n. In this embodiment, the first individual private key includes: an associated individual modulus $n_1$ that is determined as the product of a number $m_1$ of distinct prime factors of the group modulus n; and an associated individual private exponent $d_1$ that is determined based on a selected public key exponent e and based on the $m_1$ prime factors of the associated individual modulus in accordance with $$d_1 \equiv e^{-1} \bmod (\prod_{j \leq m_1} (p_j 1)),$$

wherein $p_1 \ldots p_{m1}$ represent the first number $m_1$ of the distinct prime factors.

The first partial digital signature $S_1$ may be generated based on the relationship $$S_1 \equiv M^{d_1} \pmod{n_1}.$$

In accordance with one aspect of the present invention, the step of combining the results associated with the first and second partial digital signatures includes combining the results in accordance with a Chinese Remainder Algorithm. In one embodiment, the step of combining results of the sub-tasks is performed in accordance with the relations $$Y_i \equiv Y_{i-1} + ((S_i - Y_{i-1})(w_i^{-1} \bmod n_i) \bmod n_i) \cdot w_i \bmod n,$$

wherein $2 \leq i \leq z$, and $$S = Y_k, Y_1 = S_1, \text{ and } w_i = \prod_{j<i} n_j.$$

In another embodiment, the step of combining results of the sub-tasks is performed in accordance with the relations $$S \equiv \sum_{i=1}^{z} S_i (w_i^{-1} \bmod n_i) w_i \bmod n,$$

wherein $$w_i = \prod_{j \neq i} n_j.$$

The foregoing and other objects, features, and advantages of the present invention will be apparent from the following detailed description of the preferred embodiment which makes reference to the several figures of the drawing.

IN THE DRAWING

Figures 3, 4:
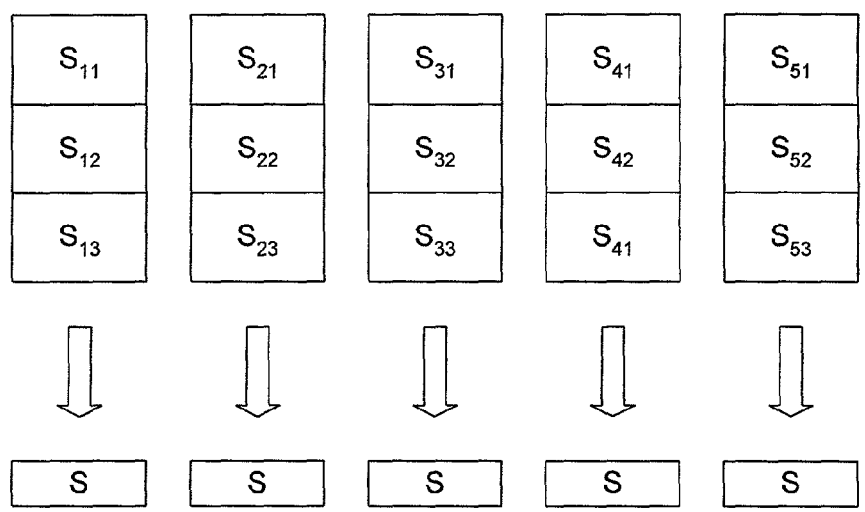
Figure 7:
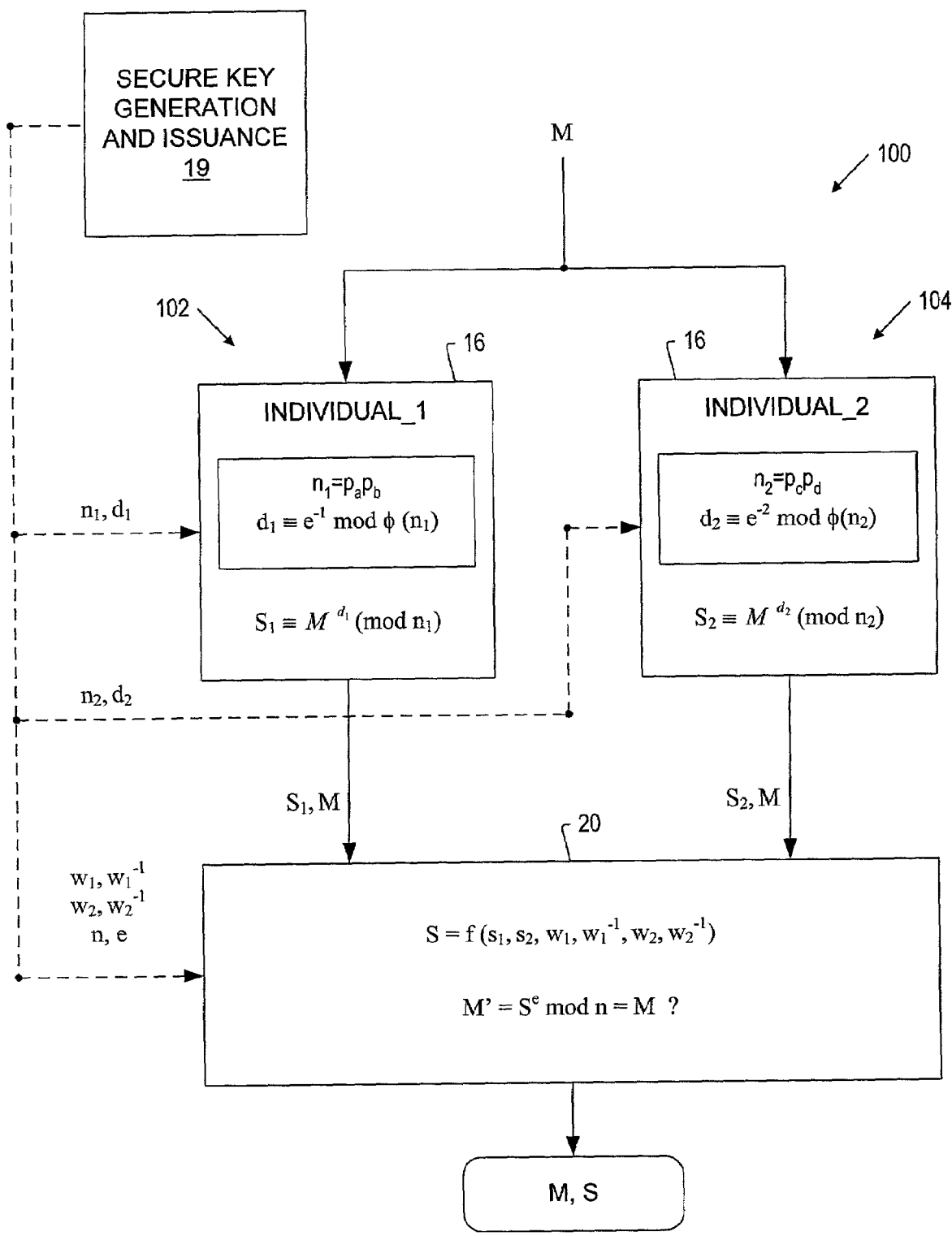

FIG. 3 is a table diagram illustrating one example of the creation and symmetric distribution of individual private keys to members of a number G of different groups, each group having Z individual members, wherein the members of each group may act collectively to execute the same group digital signature, and wherein each individual private key is created based on an associated individual modulus $n_{g,z}$ formed from a unique combination of M primes selected from a total number of primes K;

FIG. 4 is a table diagram illustrating a plurality of individual partial digital signatures each being associated with one of the individuals in one of the groups illustrated in FIG. 3, wherein each group may execute the group digital signature only upon execution of each of the partial digital signatures by each member of the group;

FIG. 5 is a table diagram illustrating an example of an asymmetric distribution of a plurality of individual private keys to members of a plurality of different groups, wherein at least one individual in at least one of the groups is assigned a modulus formed from a different number of primes as compared with the number of primes forming the moduli assigned to other members of the same group;

FIG. 6 is a table diagram illustrating an example of an asymmetric distribution of a plurality of individual private keys to members of a plurality of different groups organized to operate in a hierarchical manner, wherein at least one high level shared member must ratify the execution of a group digital signature by at least one of the different groups; and FIG. 7 is a generalized flow diagram illustrating a process of generating a group digital signature in accordance with one embodiment of the present invention.

DETAILED DESCRIPTION OF THE PREFERRED EMBODIMENTS

Often in a corporate environment, there are certain business decisions that may only be approved by a group of specified individuals of the corporation, that is wherein no single individual can approve the decision alone. As an example, a corporate structure may require that certain financial decisions which bind the corporation may only be made on behalf of the corporation by a specified group of financial officers who may act only upon ratification of a decision by all of the officers. The corporate structure and protocol may also dictate that the outside world need not know exactly which individuals of the corporation are approving decisions. The present invention provides a method and apparatus of generating a group digital signature that satisfies each of the aforesaid requirements.

A business entity (e.g., a corporation), or other organization, may include a number of different groups (e.g., different divisions of a corporation, or different committees of an organization) each including a plurality of individuals (e.g., designated officers of a corporate divisions). The entity may desire to have a single digital signature that may be generated by each of the different groups of individuals. The system and method of the present invention provides for creating and distributing individual private keys to a plurality of authorized individuals each of whom may then sign a message using his or her associated individual private key to create an associated partial digital signature. The partial digital signatures are then combined mathematically to create a group digital signature. In accordance with one embodiment of the present invention, none of the individuals in the group holds more than one of the private keys, and therefore, each of the individual members of a group must sign the message to create the group digital signature.

A business entity, or other organization, may also wish to empower different groups of individuals within the entity to act on behalf of the entity. However, the entity may desire to have a single public key that may that may be used to verify group signatures generated by any of the different groups of individuals. For example, a corporation may include a number of different divisions each having a plurality of individuals (e.g., designated officers of the divisions) authorized to make decisions on behalf of that division only as a group. If the corporation desires to have only one corporate public key, then the authorized individuals within each of the different divisions must be able to generate the corporate signature. Where an entity wishes to empower different groups of individuals to act on behalf of the entity, the system and method of the present invention provides for creating and distributing individual private keys to the individuals within the different groups in accordance with a scheme wherein each group is capable of generating a valid signature for the entity. However, any outside party receiving a signed message from the entity would not be able to distinguish which group generated the signature.

Figure 1:
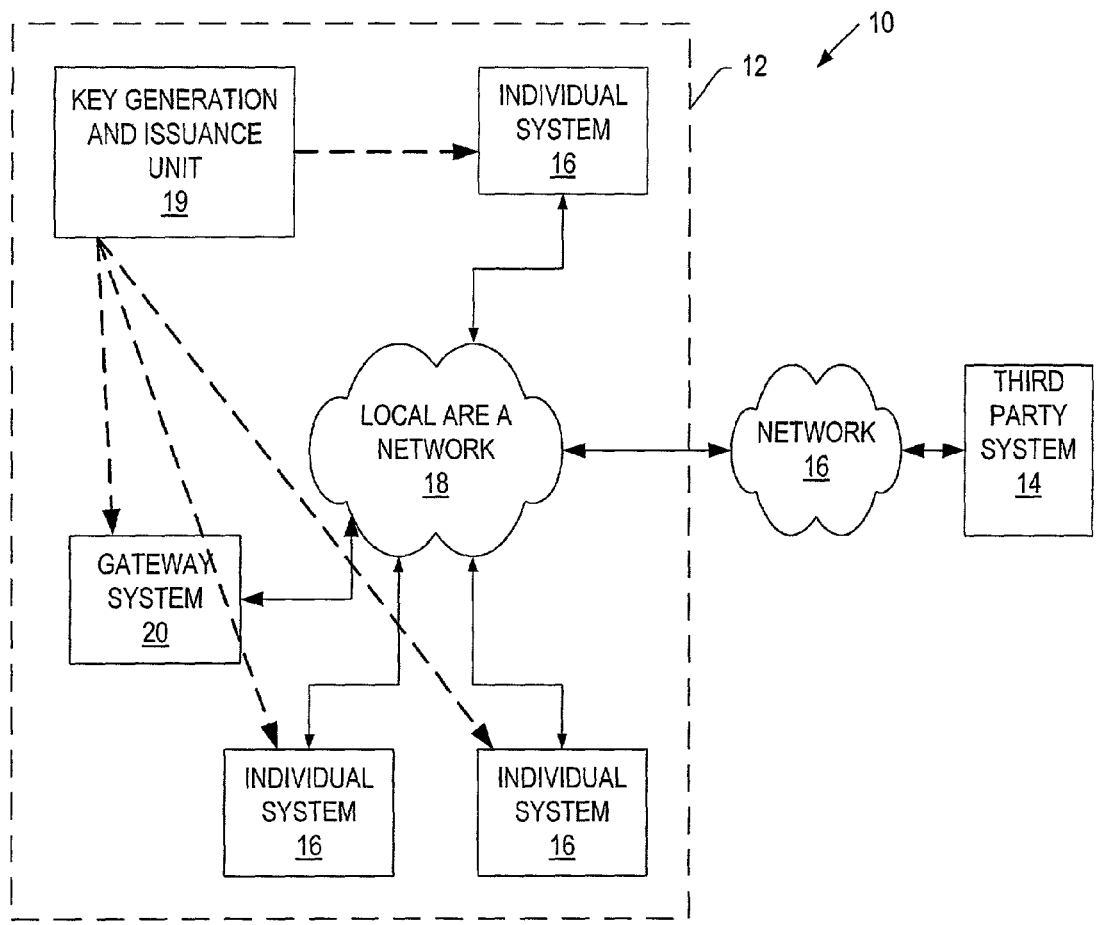
FIG. 1 is a block diagram generally illustrating a computer system network that may be used in accordance with the present invention for generating a group digital signature based on a plurality of partial digital signatures.

FIG. 1 shows a block diagram generally illustrating a network system at 10 that may be used to facilitate the method of the present invention for generating a group digital signature. The system 10 includes a local corporate network system 12 communicatively coupled with a third party computer system 14 via a network 16 such as an IP network (e.g., the Internet). The corporate network system 12 includes a plurality of individual systems 16 each being communicatively coupled with the third party computer system 14 via a local area network (LAN) 18 that is connected to the network 16.

The system 12 also includes a key generation and issuance unit 19 for generating and issuing private keys to be used by individual members of one or more groups for generating digital signatures in accordance with the present invention. In accordance with the present invention, private keys generated by the unit 19 must be issued to individuals via a secure channel. In one embodiment, private keys generated by the unit 19 are issued to individuals via secure channels implemented over the network 18. In another embodiment, the key generation and issuance unit 19 may be a smart card key loading facility that issues private keys to individuals by insertion of a smart card into the unit. As explained below, the smart card and the issuance facility may be implemented in accordance with any commercially available smart card technology. In one embodiment of the present invention, the key generation and issuance unit 19 also pre-computes parameters for use in combining the partial digital signatures in to a group digital signature. As further explained below, the group digital signature parameters may include weighting factors used for combining the partial digital signatures in accordance with a Chinese Remainder Algorithm.

The system 12 further includes a gateway system 20 including a secure combining entity for combining the partial digital signatures in to a group digital signature. In addition, this entity may perform such functions as receiving and storing partial signatures for a given message until a sufficient set is available for combining, receiving and storing different messages until signed, and verifying the validity of each group signature produced (using the public key) before issuing the signed message to the designated external recipient. In the depicted embodiment of the present invention, the secure combining entity receives the group digital signature parameters from the key generation and issuance unit 19. In an alternative embodiment of the present invention, the key generation and issuance unit 19 and the gateway system 20 may be integrated within the same unit.

Figure 2:
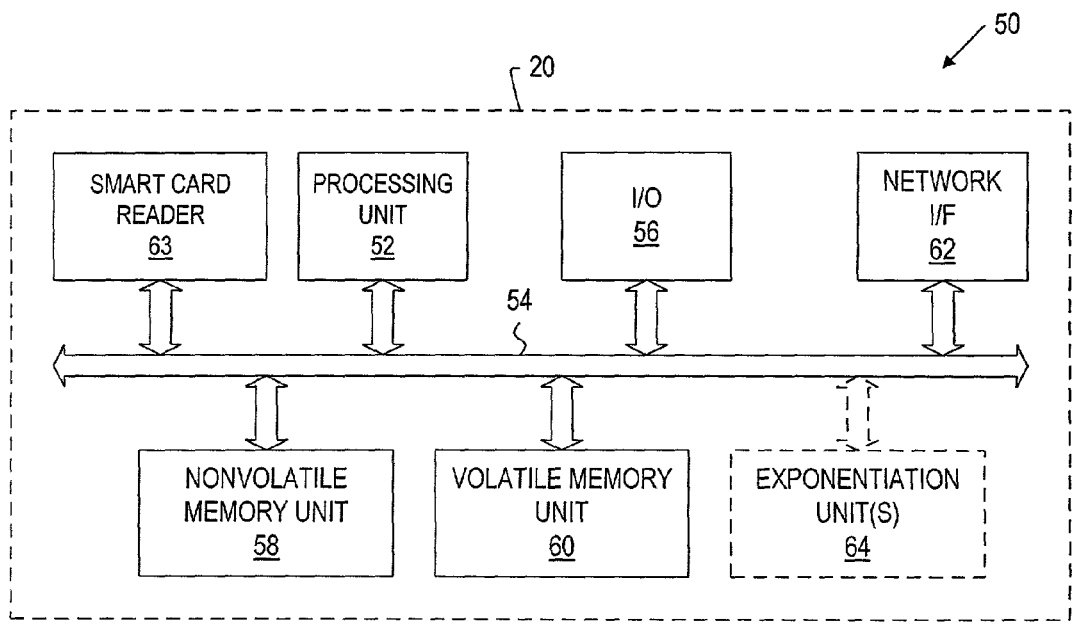
FIG. 2 is a block diagram generally illustrating one embodiment of an individual system that may be used in the network of FIG. 1 to create one of a plurality of partial digital signatures that may be combined to form a group digital signature in accordance with the present invention.

FIG. 2 shows a block diagram generally illustrating an embodiment at 50 of one of the individual computer systems 14 that may be used in accordance with the present invention. In varying embodiments, the system at 50 may be a personal computer, a personal digital assistant (PDA), a cellular telephone, or any other electronic means for storing, reading, or generating an individual private key value that may be used to create a partial digital signature associated with an individual. In the depicted embodiment, the system 50 includes: a processing unit 52 communicatively coupled with a system bus 54; an input/output unit 56 such as a keyboard pad coupled with the processing unit via the system bus; a non-volatile memory unit 58 (e.g., a hard disk drive, or an erasable programmable ROM) coupled with the processing unit via the system bus; and a network interface 62 providing for communication with remote devices via a network (e.g., a local area network (LAN), or an Internet Protocol (IP) network), and also being connected to the system bus.

The non-volatile memory unit 58 provides for storing computer readable instructions including instructions for generating an individual partial digital signature using an individual private key associated with a unique individual RSA-type system that uses an associated individual modulus consisting of a number of primes controlled by the associated user of the individual computer system. The non-volatile memory unit 58 may be used to store an individual private key. In another embodiment of the present invention, the individual private key may be maintained in a more secure environment in accordance with any of a variety of well known methods for secure maintenance of a private data. For example, the individual private key may be stored on a smart card held by the individual. In this embodiment, the system 50 may include a smart card reader 63 connected to the system bus for reading the individual private key so that it may be used to generate an individual partial digital signature as explained below. All that is important is that each private key be stored within a secure boundary, and that each partial signature be computed within a secure boundary so that even the individual does not know his own private key or related intermediate results.

In accordance with one embodiment, the system 50 may optionally include one or more exponentiation units 64 each being operative to perform exponentiation operations. U.S. patent application Ser. No. 09/328,726, filed on Oct. 26, 1998, by Collins et al., which is incorporated herein by reference, describes a Multi-Prime cryptographic scheme which uses a composite modulus having more than two prime factors. In accordance with the Multi-Prime cryptographic scheme, a public key E (including a composite number n and a number e) is determined. A plurality of k (wherein k is an integer greater than 2) random large, distinct prime numbers, $p_1, p_2, \ldots p_k$ are developed and checked to ensure that each of $(p_1-1), (p_2-1), \ldots,$ and $(p_k-1)$ is relatively prime to the number e. Preferably, the prime numbers $p_1, p_2, \ldots p_k$ are of an equal length L in bits. Then, the composite modulus n is defined in accordance with relationship (1) below, $$n = p_1 \cdot p_2 \cdot \ldots \cdot p_k \tag{1}$$

As further explained below, the composite number n provides a modulus for encrypting and decrypting, and the prime numbers (or "primes") $p_1, p_2, \ldots p_k$ are referred to as factors of the modulus n. The primes $p_1, p_2, \ldots p_k$ must satisfy three general criteria in order to be used in a Multi-Prime cryptographic system. The primes $p_1, p_2, \ldots p_k$ must satisfy the criteria of being distinct, random, and suitable for use in the Multi-Prime cryptographic system.

In order to be distinct, the primes $p_i = p_1, p_2, \ldots p_k$ must satisfy the constraint (2), below.

$$p_i \neq p_j \text{ for } i \neq j \tag{2}$$

In order to be considered random, each of the primes must be produced with equal likelihood and uniformly across the allowed range of values, and they must be statistically independent, that is the prime numbers must satisfy the constraint (3), below:

$$P(p_j = p_B | p_i = p_A) = P(p_j = p_B) \tag{3}$$

wherein $P(p_j = p_B)$ is the probability that $p_j$ takes the value $p_B$ and $P(p_j = p_B | p_i = p_A)$ is the probability that $p_j$ takes the value $p_B$ knowing that $p_i$ has the value $p_A$.

In order to be suitable for use in the Multi-Prime cryptographic system, the primes $p_i = p_1, p_2, \ldots p_k$ must satisfy the constraints (4a) and (4b), below.

$$2^{L-1} < p_1 \cdot p_2 \cdot \ldots \cdot p_k < 2^L \tag{4a, and}$$

$$e \text{ does not have any common divisors with } p_i-1 \tag{4b}$$

Stated alternatively, constraint (4b) requires that each prime $p_i$ must satisfy the relationship; $GCD(e, p_i-1) = 1$. This constraint requires that the public exponent e and $(p_i-1)$ be relatively prime. If e and $(p_i-1)$ have a common divisor greater than 1, then $p_i$ must be rejected as a suitable key prime.

It is also noted here that there is an alternative statement of this constraint on the primes which may be considered for use in an RSA type cryptographic system. This constraint is reflected in the linear congruency of relationship (5), below.

$$e \cdot d \equiv 1 \bmod \phi(n) \tag{5}$$

where $\phi(n)$ is Euler's totient function. Here, d is the private key exponent and is the multiplicative inverse of e mod $\phi(n)$ where e is the public key exponent. The Totient function may be expressed in accordance with relationship (6), below.

$$\phi(n) = (p_1-1) \cdot (p_2-1) \ldots \cdot (p_k-1) \tag{6}$$

where $n = p_1 \cdot p_2 \cdot \ldots \cdot p_k$.

The linear congruency of relationship (5), above has a unique solution d if and only if $GCD(e, \phi(n)) = 1$. That is, e must be relatively prime to $\phi(n)$. This means that e must not have common divisors with $(p_1-1)$ or $(p_2-1) \ldots$ or $(p_k-1)$.

A private key $D = (n, d)$, including the modulus n and private key exponent d, is established in accordance with relationship (7), below $$d \equiv e^{-1} \bmod ((p_1-1)(p_2-1) \ldots (p_k-1)) \tag{7}$$

In accordance with the digital signature application of the multi-prime cryptographic scheme, the signing of a message M begins with computation of the hash value h(M) of the message M using any one of several well known hash functions. For simplicity, the hash value of a message M is represented hereinafter simply as "M". The hash of the message M is then encoded to a signature S by an encoding process using the private key D in possession of the sender. In this application, the digital signature process of the multi-prime scheme is performed in accordance with relationship (8), below.

$$S \equiv M^d (\bmod n), \tag{8}$$

wherein
$0 \leq M \leq n-1$,

A verification process of the Multi-Prime signature scheme provides for converting the signature S to a candidate hash h(M)' using the public exponent e as a verification exponent in accordance with relationship (9) below.

$$h(M)' \equiv S^e (\bmod n), \tag{9}$$

A party wishing to verify the signed message M would of course need to know the public key including modulus n and the public exponent e in order to compute h(M)'. After computing h(M)', if it is determined that h(M) = h(M)', the signature would be verified as originating from the entity associated with the public exponent e and the modulus n.

The multi-prime cryptographic group signature process for a group of z members includes a first step of defining a plurality of z sub-tasks in accordance with relationships (10) below.

$$S_1 \equiv M_1^{d_1} (\bmod n_1), \tag{10}$$

$$S_2 \equiv M_2^{d_2} (\bmod n_2),$$

$$\vdots$$

$$S_z \equiv M_z^{d_z} (\bmod n_z),$$

wherein $M_1 \equiv M (\bmod n_1),$ $M_2 \equiv M (\bmod n_2),$

-continued $$M_z \equiv M(\bmod n_z),$$

$$d_1 \equiv d(\bmod \phi(n_1)),$$

$$d_2 \equiv d(\bmod \phi(n_2)),$$

$$\vdots$$

$$d_z \equiv d(\bmod \phi(n_z)), \text{ and}$$

$\phi(n)$ represents Euler's Totient Function

The above recited sub-tasks are then solved to determine results $S_1, S_2, \ldots S_z$ which are subsequently combined in accordance with a combining process to produce the signature S. The Chinese Remainder Theorem provides a mathematical proof which proves the existence of a unique solution to the sub-tasks described in accordance with the congruency relationships (10) above.

U.S. patent application Ser. No. 09/328,726 teaches the use of either a recursive combining process or a summation process for combining the results $S_1, S_2, \ldots S_z$ to produce the signature S. The recursive combining process may be performed in accordance with relationship (11), below.

$$Y_i \equiv Y_{i-1} + ((S_i - Y_{i-1})(w_i^{-1} \bmod n_i) \bmod n_i) \cdot w_i \bmod n, \quad (11)$$

wherein $2 \leq i \leq z$, and
$S=Y_k$, $Y_1=S_1$, and $$w_i = \prod_{j<i} n_j.$$

The summation combining process may be performed in accordance with relationship (12), below.

$$S \equiv \sum_{i=1}^{z} S_i(w_i^{-1} \bmod n_i) w_i \bmod n, \quad (12)$$

wherein $$w_i = \prod_{j \neq i} n_j.$$

In the described embodiment of the present invention, the CRT combining parameters $w_i$, also called weights, constitute the group digital signature parameters pre-computed by the key generation and issuance unit 19 (FIG. 1). The CRT parameters $w_i$ are precomputed by the key generation and issuance unit, and securely passed to the secure combining entity of the gateway system 20 (FIG. 1) for use in combining partial digital signatures into a group digital signature.

A public key may be associated with any type of entity including an individual, a group of individuals, an office, a corporate entity, or a particular department of a corporation. The present invention provides a novel system and method enabling a group of individual signatories to digitally sign a message that may be validated using a group public key pair E=(e, n) wherein e provides a group public key exponent, and n provides a group modulus defined in accordance with relationship (1) reproduced below, $$n = p_1 \cdot p_2 \cdot \ldots \cdot p_k \quad (1)$$

wherein k is the total number of prime numbers allocated for the group. As further explained below, the composite number n provides the group modulus for signing and verifying messages associated with an entity represented by the group, and the prime numbers $p_1, p_2, \ldots p_k$ are referred to as factors of the group modulus n. As mentioned, the prime numbers $p_1, p_2, \ldots p_k$ satisfy the criteria of being distinct, random, and suitable in accordance with relationships (2) through (6), above. The private key D, defined in accordance with relationship (7) above, which includes the composite number n and the private exponent d, provides a group private key which is never revealed or distributed.

In accordance with the present invention, a message M is signed by a group of individuals to a create a signature S by a signing process using the group private key D wherein each of the members of each group has control over at least one of the prime factors $p_1, p_2, \ldots p_k$, and wherein each group of individuals collectively has control of all of the prime factors $p_1, p_2, \ldots p_k$, but wherein no single one of the individuals of the group controls all of the prime factors used by the entity.

The total number k of prime numbers may be allocated to the individuals of a group in a number of different ways. Each of the individual signatories of a group is assigned at least one of the whole set of prime numbers $p_1, p_2, \ldots p_k$. This may be expressed as a number of combinations of k primes.

Each of the individual members of a group is assigned at least one of the total number k of prime numbers $p_1, p_2, \ldots p_k$. The prime number(s) assigned to each individual are used to create an associated individual modulus and an associated individual private key to be used by the individual to generate an individual partial digital signature in accordance with a unique individual RSA-type system. In accordance with the present invention, individual moduli must be relatively prime within a group, requiring that the component primes not be shared. Also in accordance with the present invention, different combinations of the total number k of prime numbers $p_1, p_2, \ldots p_k$ may be assigned to different individuals.

In accordance with a symmetric distribution of the primes to individuals of one or more groups, each of the individuals of each group is assigned an individual private key $D_{IND}$ that is formed based on a number m of prime factors, wherein m<k. The number of combinations of the k prime factors taken m at a time dictates the number of unique individual private keys that may be created based on the total number k prime factors. The number of combinations of k prime factors taken m at a time may be expressed in accordance with relationship (13), below.

$$A = \binom{k}{m} = \frac{k!}{m!(k-m)!} \quad (13)$$

This total number of combinations A is partitioned into G groups of Z members each, so A=G·Z, where Z=k/m. Thus $$A = G \cdot Z = G \cdot k/m, \text{ and}$$

$$G = A \cdot \frac{m}{k} = \frac{(k-1)!}{(m-1)!(k-m)}$$

In one type of embodiment employing a symmetric distribution, k is even, m=2, Z=k/2, and G=(k−1)!/(k−2)!=k−1, which relations may be used in reverse to construct such a system, for example choosing Z=4 yields k=8, G=7, m=2, and A=28.

FIG. 3 shows a table diagram illustrating one example of the creation and symmetric distribution of individual private keys to members of a number G of different groups, each group having Z individual members, wherein the members of each group may act collectively to execute the same group digital signature, and wherein each individual private key is created based on an associated individual modulus formed from a unique combination of m primes selected from the total number of primes k. In the example depicted in FIG. 3, it is assumed that there is a total number k=6 of prime factors used in the group Multi-Prime cryptosystem, and that each individual is to be assigned a number m=2 of prime factors for forming an individual private key $D_{IND}$.

In the depicted example, a unique private key pair $D_{IND}= (d_{g,z}, n_{IND})$ may be assigned to each of fifteen different individuals wherein g is the number of groups authorized to act on behalf of the entity using the group private key D, and z is the number of individuals in each group. Because each of the individuals is assigned m=2 prime values and because there are only a total of k=6 prime values in the group Multi-Prime crypto-system, each group may include only z=3 individuals each being assigned a unique selected pair of the prime factors. Therefore, in the present example, g=5 groups are formed wherein each group consists of z=3 individual members.

Each of the individual moduli $n_{g,z}$ within a group have no common factors. For example, none of the three individual moduli in GROUP_1 ($n_{11}=p_1p_6$, $n_{12}=p_2p_3$, and $n_{13}=p_4p_5$) include common factors. As mentioned above, each of the individual moduli $n_{g,z}$ should be protected for security purposes. Referring back to FIG. 1, each individual modulus $n_{g,z}$ may be stored in a secure memory location (which may itself be cryptographically protected) within an associated one of the individual systems, or may be contained in an associated one of the individual systems from a smart card held by the associated individual.

In order for one of the groups to generate the group digital signature S, each of the individual members of the group must sign a message using an associated unique individual private key pair $D_{IND}=(d_{IND}, n_{IND})$ wherein $d_{IND}$ is an individual private key exponent, and $n_{IND}$ is the composite number providing the individual modulus. So, each of the individuals generates a partial individual signature $S_{g,z}$ in accordance with an associated individual cryptosystem defined by $d_{IND}$ and $n_{IND}$. Each of the partial individual signature $S_{g,z}$ is generated in accordance with relationship (14), below.

$$S_{g,z} \equiv M^{d_{g,z}} (\bmod n_{g,z}) \qquad (14)$$

wherein $d_{g,z}$ is the individual private key exponent $d_{IND}$ associated with the particular individual.

Partial digital signatures are generated by each individual at a corresponding one of the individual systems 16 (FIG. 1) based on the associated individual cryptosystem defined by the associated individual modulus $n_{IND}$ and the associated individual private key exponent $d_{IND}$. For example, the INDIVIDUAL_1 in GROUP_1, assigned the individual modulus $n_{11}=p_1p_6$, generates a first partial digital $S_{11}$ in accordance with, $$S_{1,1} \equiv M^{d_{1,1}} (\bmod n_{1,1})$$

wherein $d_{1,1} \equiv e^{-1} \bmod \phi(n_{g,z})$

FIG. 4 shows a table diagram illustrating the partial digital signatures associated with each of the individuals in each of the groups illustrated in FIG. 3. Each of the groups of individuals may complete the same group digital signature S only upon execution of each of the partial digital signatures by each of the associated members of the group. In the example depicted in FIGS. 3 and 4, the individual private keys are created and distributed so that none of the partial digital signatures can be used outside of its associated group to form a valid group digital signature. None of the partial digital signatures can be combined outside of its associated group to form the enterprise signature because all of the moduli used to generate enterprise signature must be relatively prime. The primes are distributed so as to prevent useful combination of partial digital signatures across groups.

FIG. 5 shows a table diagram at 80 illustrating an example of an asymmetric distribution of a plurality of individual private keys to members of a plurality of different groups, wherein at least one individual in at least one of the groups is assigned a modulus consisting of a different number of primes as compared with the number of moduli assigned to other members of the same group. In the depicted example, a total number of k=3 prime factors ($p_1$, $p_2$, and $p_3$) are distributed across three groups each having two individual members. A first individual (INDIVIDUAL_1) in each of the three groups receives an associated one of the three prime factors. The second individual (INDIVIDUAL_2) in each of the three groups receives the other two of the three prime factors which were not assigned to the first individual. In accordance with this form of asymmetric distribution, the members of each group are still isolated in that the partial digital signatures cannot be combined across groups to form the valid group digital signature.

FIG. 6 is a table diagram illustrating an example of an asymmetric distribution of a plurality of individual private keys to members of a plurality of different groups that are organized to operate in a hierarchical manner, wherein at least one high level common member must ratify the execution of a group digital signature by at least one of the different groups. In the depicted example, moduli formed from a total number of k=5 prime factors ($p_1$, $p_2$, $p_3$, $p_4$, and $p_5$) are distributed across two groups each having three individual members wherein one individual who is a member of both groups uses the same individual private key to ratify decisions made by both groups. INDIVIDUAL_1, who is assigned the private key $p_1$, uses the private key $n_{11}=p_1$ in GROUP_1 and $n_{21}=p_1$ in GROUP_2. In accordance with this form of asymmetric distribution, the members of each group are not completely isolated because the partial digital signature associated with INDIVIDUAL_1 can be combined with the partial individual signatures of the other members of either group to form the valid group digital signature.

FIG. 7 shows a flow diagram illustrating a process of generating a group digital signature in accordance with one embodiment of the present invention wherein the group consists of Z=2 individuals designated INDIVIDUAL_1 and INDIVIDUAL_2. The secure key generation and issuance unit 19 (FIG. 1) generates and issues individual moduli and private keys to the individual members INDIVIDUAL_1 and INDIVIDUAL_2 for generating individual partial digital signatures $S_1$ and $S_2$ in accordance with the present invention. As described above, the individual moduli and private keys are issued to the individuals via a secure channel (e.g., using a secure token such as a smart card). The key generation and issuance unit 19 also pre-computes and distributes the CRT weights (for use in combining the partial digital signatures $S_1$ and $S_2$ into a group digital signature) to the secure combining entity of the gateway system 20 (FIG. 1).

As shown at 102, a first INDIVIDUAL_1 is assigned a first individual modulus $n_1$ formed from primes $p_a$ and $p_b$. A first partial digital signature $S_1$ for a message M may be determined at an associated one of the individuals systems 16 (FIG. 1) in accordance with, $$S_1 \equiv M^{d_1}(\bmod\ n_1),$$

wherein the private key elements, $d_1 \equiv e^{-1}\ \bmod\ \phi(n_1)$, and $n_1 = p_a \cdot p_b$ have been previously generated, assigned, and securely issued by the key generation facility into the control of INDIVIDUAL_1.

As shown at 104, the second INDIVIDUAL_2 is assigned a second individual modulus $n_2$ formed from primes $p_c$ and $p_d$. A second partial digital signature $S_2$ may be determined at an associated one of the individuals systems 16 (FIG. 1) in accordance with, $$S_2 \equiv (\bmod\ n_2),$$

wherein the private key elements $d_2 \equiv e^{-1}\ \bmod\ \phi(n_2)$, and $n_2 = p_c \cdot p_d$ have been previously generated, assigned, and securely issued by the key generation and issuance unit 19 into the control of INDIVIDUAL_2.

At completion of a similar subtask by each such member of a particular group, each partial signature is transmitted to the secure combining facility which is implemented at the gateway system 20. After receipt and accumulation of all of necessary partial signatures by the secure combining facility, a Chinese Remainder Algorithm may be used to combine the partial signatures $S_1$ and $S_2$ in accordance with either of relationships (11) and (12), above, to generate the group digital signature S using the CRT parameters or weights $w_1$, $w_1^{-1}$, $w_2$, and $w_2^{-1}$ previously generated, assigned, and securely issued by the key generation facility into the control of the combining facility. The combining facility may then optionally perform the additional step of verifying the signature S using the public key of the entity in accordance with relationship (9) above, before transmitting the message M and appended signature S to the designated external recipient. Such verification would avoid the issuance of an invalid signature in the case of a computational error.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for generating a group digital signature wherein each of a group of individuals may sign a message M to create a group digital signature S, wherein M corresponds to a number representative of a message, $0 \leq M \leq n-1$, n is a composite number formed from the product of a number k of distinct random prime factors $p_1 \cdot p_2 \cdot \ldots \cdot p_k$, k is an integer greater than 2, and $S \equiv M^d\ (\bmod\ n)$, comprising the steps of:

a first individual in a group performing a first partial digital signature subtask on a message M using a first individual private key to produce a first partial digital signature $S_1$;

at least a second individual in said group performing a second partial digital signature subtask on said message M using a second individual private key to produce a second partial digital signature $S_2$; and combining said partial digital signature results including said results $S_1$ and $S_2$ to produce the group digital signature S corresponding to said message M;

wherein said step of combining said results associated with said first and second partial digital signatures includes:

combining said results in accordance with a Chinese Remainder Algorithm.

2. A method for generating a group digital signature as recited in claim 1 wherein the group comprises z individuals whose private key moduli $n_i$ are relatively prime, wherein said step of combining results of said sub-tasks is performed in accordance with the relations $$Y_i = Y_{i-1} + ((S_i - Y_{i-1})(w_i^{-1}\ \bmod\ n_i)\bmod\ n_i) \cdot w_i\ \bmod\ n,$$

wherein $2 \leq i \leq z$, and $$S = Y_k,\ Y_1 = S_1,\ \text{and}\ w_i = \prod_{j<i} n_j.$$

3. A method for generating a group digital signature as recited in claim 1 wherein the group comprises z individuals whose private key moduli $n_i$ are relatively prime, wherein said step of combining results of said sub-tasks is performed in accordance with the relations.

$$S = \sum_{i=1}^{z} S_i(w_i^{-1} \bmod n_i)w_i \bmod n,$$

wherein $$w_i = \prod_{j \neq i} n_j.$$

4. A method of creating and assigning individual private keys as recited in claim 3 wherein the keys are created and assigned in accordance with a symmetric distribution of the k prime factors of n, wherein each of the individual members of a group is assigned an individual private key based on a modulus formed as a product of m distinct prime factors, and wherein m<k.

5. A method of creating and assigning individual private keys as recited in claim 3 wherein the keys are created and assigned in accordance with an asymmetric distribution of the k prime factors of n, wherein at least one of the individual members of a group is assigned an individual private key based on a modulus formed as a product of $m_1$ distinct prime factors, and wherein at least one other member of said group are assigned individual private keys each based on a modulus formed as a product of $m_2$ distinct prime factors, wherein $m_1 < m_2 < k$.

6. An apparatus for generating a group digital signature as recited in claim 5, wherein the secure key generation facility and secure group signature combining entity are combined within a common security boundary.

7. An apparatus for generating a group digital signature as recited in claim 5, including:
   means for transferring individual private keys generated by the secure key generation facility into secure tokens for issuance to the assigned individual users of said private signing keys, and
   means for securely transferring associated secret group combining parameters from the secure key generation facility to the secure combining entity.

8. An apparatus as recited in claim 5 wherein each of said tokens is a smart card.

9. A method for generating a group digital signature wherein each of a group of individuals may sign a message M to create a group digital signature S, wherein M corresponds to a number representative of a message, $0 \leq M \leq n-1$, n is a composite number formed from the product of a number k of distinct random prime factors $p_1 \cdot p_2 \cdot \ldots \cdot p_k$ is an integer greater than 2, and $S \equiv M^d (\bmod\, n)$, comprising the steps of:
   a first individual in group performing a first partial digital signature subtask on a message M using a first individual private key to produce a first partial digital signature $S_1$;
   at least a second individual in said group performing a second partial digital signature subtask on said message M using a second individual private key to produce a second partial digital signature $S_2$; and
   combining said partial digital signature results including said results $S_1$ and $S_2$ to produce the group digital signature S corresponding to said message M;
   wherein each of said individual private keys includes,
   an associated individual modulus $n_i$ that is a number formed as a product of one or more of said k prime factors of said group modulus n, and
   an associated individual private exponent $d_i$ that is determined based on a selected public group exponent e, and also based on the prime factors of said associated individual modulus $n_i$.

10. A method for generating a group digital signature as recited in claim 9 wherein each of said individual private exponents $d_i$ is determined as a number congruent to the inverse of said public group exponent e, modulo the Euler Totient function of said associated individual modulus $n_i$.

11. A method for generating a group digital signature as recited in claim 9 wherein said first partial digital signature $S_1$ is generated based on the relationship $$S_1 = M^{d_1}(\bmod\, n_1).$$

12. A method for generating a group digital signature wherein each of a group of individuals may sign a message M to create a group digital signature S, wherein M corresponds to a number representative of a message, $0 \leq M \leq n-1$, n is a composite number formed from the product of a number k of distinct random prime factors $p_1 \cdot p_2 \cdot \ldots \cdot p_k$ is an integer greater than 2, and $S \equiv M^d(\bmod\, n)$, comprising the steps of:
   a first individual in a group performing a first partial digital signature subtask on a message M using a first individual private key to produce a first partial digital signature $S_1$;
   at least a second individual in said group performing a second partial digital signature subtask on said message M using a second individual private key to produce a second partial digital signature $S_2$; and
   combining said partial digital signature results including said results $S_1$ and $S_2$ to produce the group digital signature S corresponding to said message M;
   wherein the first individual is assigned a first number $m_1$ of the k prime factors of said group modulus n and the second individual is assigned a second number $m_2$ of the k prime factors of said group modulus n, and wherein:
   said first individual private key includes,
   an associated individual modulus $n_1$ that is determined as the product of a number $m_1$ of distinct prime factors of said group modulus n, and
   an associated individual private exponent $d_1$ that is determined based on a selected public key exponent e and based on the $m_1$ prime factors of said associated individual modulus in accordance with $$d_1 \equiv e^{-1} \bmod (\prod_{j \leq m_1} (p_j 1)),$$

wherein $p_1 \ldots p_{m1}$ represent the first number $m_1$ of said distinct prime factor.

13. A method for generating a group digital signature wherein each of a group of individuals may sign a message M to create a group digital signature S, wherein M corresponds to a number representative of a message, $0 \leq M \leq n-1$, n is a composite number formed from the product of a number k of distinct random prime factors $p_1 \cdot p_2 \cdot \ldots \cdot p_k$, k is an integer greater than 2, and $S \equiv M^d(\bmod\, n)$, comprising the steps of:
   a first individual in a group performing a first partial digital signature subtask on a message M using a first individual private key to produce a first partial digital signature $S_1$;
   at least a second individual in said group performing a second partial digital signature subtask on said message M using a second individual private key to produce a second partial digital signature $S_2$; and
   combining said partial digital signature results including said results $S_1$ and $S_2$ to produce the group digital signature S corresponding to said message M;
   wherein said first individual private key is created based on associated prime factors $p_a$ and $p_b$ of the group modulus n, said first individual private key including,
   an individual modulus $n_1$ that is a composite number formed as the product $P_a \cdot P_b$ of said associated primes, and
   an associated individual private exponent $d_1$ that is determined based on a selected public key exponent e and said associated primes $p_a$ and $p_b$ in accordance with $$d_1 = e^{-1} \bmod ((p_a-1)(p_b-1)).$$

14. A method for generating a group digital signature as recited in claim 13 wherein said first partial digital signature $S_1$ is generated based on the relationship, $$S_1 = M^{d_1}(\bmod\, n_1).$$

15. A method of creating and assigning individual private keys to each member of at least one group of individuals, wherein the individuals in each group may, use their assigned keys to sign a message M to collectively create a group digital signature S associated with an entity that includes all of the groups, wherein M corresponds to a number representative of a message, $0 \leq M \leq n-1$, n is a composite number formed from the product of a total number k of distinct random primes $p_1 \cdot p_2 \cdot \ldots \cdot p_k$, k is an integer greater than 2, and $S \equiv M^d(\bmod\, n)$ and wherein each such group of individuals collectively control all of the primes, but wherein no single one of the individuals controls all of the prime factors $p_1 \cdot p_2 \cdot \ldots \cdot p_k$, comprising:

- assigning at least one of the total number k of prime numbers $p_1 \cdot p_2 \cdot \ldots \cdot p_k$ to each of a plurality of members of each of at least one group, wherein all of the prime numbers assigned to the individuals within each group are distinct;
- defining a unique individual modulus associated with each of the individuals formed as the product of the prime numbers assigned to the individual; and
- defining a unique individual private key for each of the individuals based on the associated individual modulus formed for the individual;
- whereby each of the individual private keys may be used to create an associated individual partial digital signature, wherein the individual partial digital signatures of the members of a group may be combined to form the group digital signature S, and wherein at least one of the partial digital signatures cannot be combined across different groups to form the group digital signature S.

16. A method of creating and assigning partial digital signature keys as recited in claim 15 wherein the number of combinations of the k prime factors taken m at a time dictates the number of distinct individual private keys that may be created based on the total number k prime factors, and wherein the number of combinations of k prime factors taken m at a time is expressed in accordance with $$A = \binom{k}{m} = \frac{k!}{m!(k-m)!}$$

and wherein said individual private keys are organized into $g = A/z = A \cdot m/k$ groups comprising $z = k/m$ members in each group.

17. A method of creating and assigning individual private keys as recited in claim 16 wherein the keys are created and assigned in accordance with an asymmetric distribution of the k prime factors of n, wherein at least one private key is assigned across more than one group.

* * * * *

UNITED STATES PATENT AND TRADEMARK OFFICE
CERTIFICATE OF CORRECTION

PATENT NO. : 7,093,133 B2
APPLICATION NO. : 10/037238
DATED : August 15, 2006
INVENTOR(S) : Dale W. Hopkins et al.

It is certified that error appears in the above-identified patent and that said Letters Patent is hereby corrected as shown below:

In column 1, line 13, after "information" delete "to".

In column 15, line 17, in Claim 9, insert -- , k -- before "is".

In column 15, line 20, in Claim 9, after "in" insert -- a --.

In column 15, line 41, in Claim 10, delete "$d_i^:$" and insert -- $d_1$ --, therefor.

In column 15, line 54, in Claim 12, insert -- , k -- before "is".

In column 16, line 17, in Claim 12, delete "$(P_j 1),$" and insert -- $(P_j 1))$, --, therefor.

In column 16, line 21, in Claim 12, delete "factor." and insert -- factors. --, therefor.

In column 16, line 27, in Claim 13, delete "$p_1 \cdot p_2 \cdot \ldots \cdot p_k,$" and insert -- $p_1 \cdot p_2 \cdot \ldots \cdot p_k$, --, therefor.

In column 16, line 59, in Claim 15, after "may" delete ",".

In column 16, line 66, in Claim 15, after "(mod n)" insert -- , --.

In column 17, line 2, in Claim 15, delete "$p_1 \cdot p_2 \cdot \ldots \cdot p_k,$" and insert -- $p_1, p_2, \ldots, p_k$, --, therefor.

In column 17, line 4, in Claim 15, delete "$p_1 \cdot p_2 \cdot \ldots \cdot p_k$" and insert -- $p_1, p_2, \ldots, p_k$ --, therefor.

Signed and Sealed this

Eighth Day of September, 2009

David J. Kappos
*Director of the United States Patent and Trademark Office*